No. 750,661. PATENTED JAN. 26, 1904.
M. LARAMIE.
ANIMAL TRAP.
APPLICATION FILED SEPT. 3, 1903.
NO MODEL.
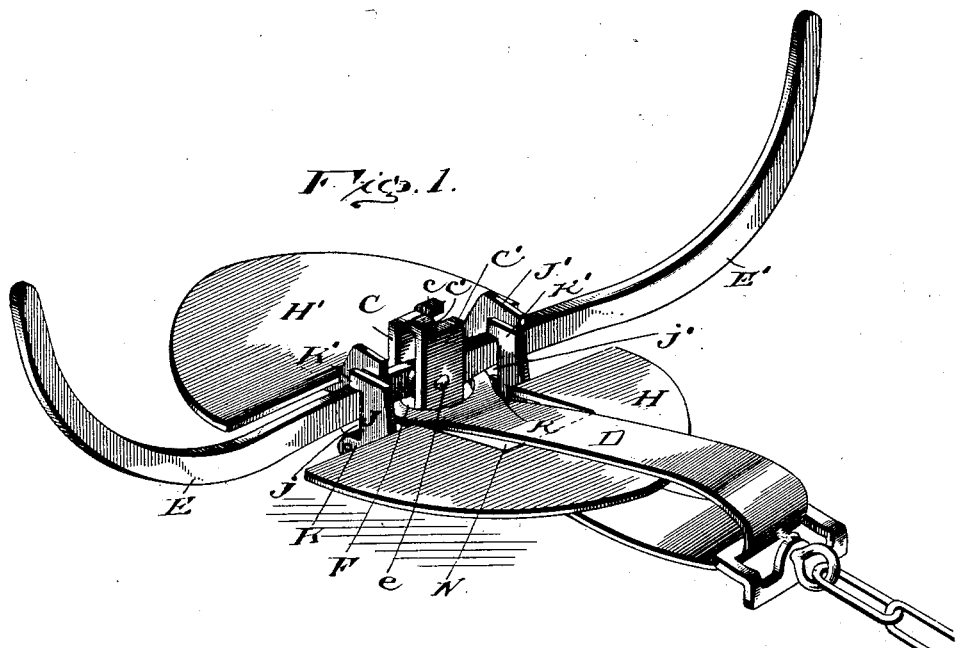
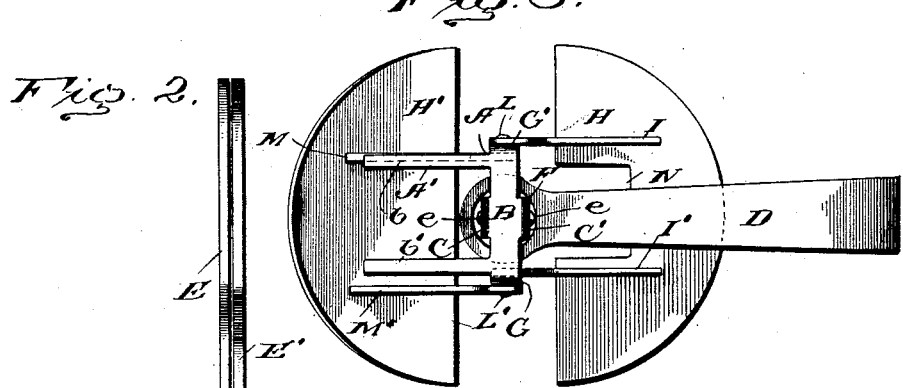
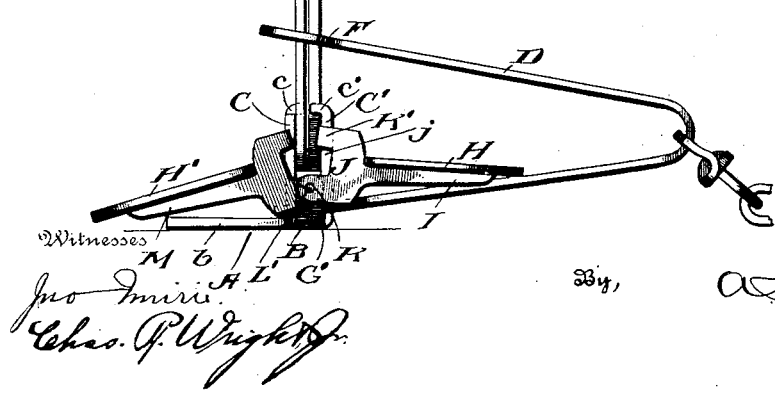

No. 750,661. Patented January 26, 1904.

UNITED STATES PATENT OFFICE.

MITCHEL LARAMIE, OF WILLIMANTIC, CONNECTICUT.

ANIMAL-TRAP.

SPECIFICATION forming part of Letters Patent No. 750,661, dated January 26, 1904.

Application filed September 3, 1903. Serial No. 171,760. (No model.)

*To all whom it may concern:*

Be it known that I, MITCHEL LARAMIE, a citizen of the United States, residing at Willimantic, in the county of Windham and State of Connecticut, have invented new and useful Improvements in Animal-Traps, of which the following is a specification.

My invention relates to improvements in animal-traps, and relates particularly to that class of jaw-traps.

The object of my invention is to provide a trap of this character in which it is impossible for the animal to spring the same from one side, but it is necessary for the animal to have a portion of its weight on each side, or, in other words, the animal will be about halfway across the trap before it can be sprung.

Another object of my invention is to provide a more simple, cheap, and effective trap to accomplish the above results without injury to the fur of the animal being caught.

In the accompanying drawings, Figure 1 is a perspective view of my improved trap set. Fig. 2 is a side view of my improved trap sprung. Fig. 3 is a bottom plan view of my improved trap.

Referring now to the drawings, A represents a base-plate, which is made of a single piece of metal. The said base is provided with the main transverse portion B, which is provided with the outwardly-extending arms $b$ and $b'$, which are adapted to support or hold the trap in a vertical position. Intermediate the arms $b$ and $b'$ the transverse portion B is provided with the integral vertically-arranged members C and C', which has surrounding the same the two ends of the V-shaped spring D. The arms C and C' are spaced slightly apart and have pivoted therebetween the two jaws E and E', which are arranged side by side and pivoted by a single pivot $e$, which passes through the jaws and the arms C and C'. In order to prevent the jaws from passing each other, I provide the upper ends of the arms C and C' with the laterally-inturned reduced ends $c$ and $c'$, and thus the jaws are prevented from passing each other. The jaws, as shown, are preferably of a curved form, and thus when they are thrown together by the spring the stops are so arranged that there is a slight space between the jaws intermediate their ends, and thus the fur of the animal will not be cut or disfigured.

The opening F in the upper end of the V-shaped spring D is of such a size that it will travel upward over the upwardly-extending arms C and C' and over the lower portions of the jaws, and thus spring the said jaws together; but said opening is of such a size that it will travel but a short distance on the jaws, owing to the curvature of the same. The lower portion of the spring D also serves as a base for supporting the trap in its normal vertical position. The ends of the transverse portion B are provided with the upwardly-extending lateral ears G and G', to which are pivoted the platforms by which the said trap is held in its set position. The said platforms consist of preferably semicircular plates H and H', one on each side of the said jaws. The plate or platform H has secured to its under side two horizontal members I and I', which extend out beyond the inner edge of the platform. The said portions J and J' beyond the platform are broadened out and are vertically disposed, as clearly shown in Fig. 2 of the drawings. The member J is provided with a central cut-away portion $j$, which forms an outwardly-extending ear K and K' at the top and bottom thereof. The portion J' is also provided with a cut-away portion $j''$, which forms an ear $k$ and $k'$ at both the top and bottom thereof. The said members I and I' are secured to the platform H a distance apart equal to the distance between the upwardly-extending ears G and G', and thus it will be seen that the member J is on the outside of the ear G and the member J' on the inside of the ear G'. Passing through the ears G and G' and through the ears or lugs K $k$ carried by the members are pivots L and L', which allow of the swinging of the platforms, and the upper ears K' and $k'$ are adapted to pass over the jaws, and thus they are held in their set position. The platform H' has secured to its under side horizontal members M and M', which are arranged in precisely the same manner as the members I and I'—one on the outside of the ear G and the other on the inside of the ear G'—and are pivoted on the same pivots as the members carried by the other platform. The platform H is centrally cut away at N in order to allow the upper portion of the spring to be forced down below the pivoted point of the jaws when the trap is set. By this construction it is readily seen that an animal treading on either platform will force the lugs carried thereby from over the jaws; but the other lugs carried by the other platform still hold the jaws in their set position, and it is necessary that both platforms be forced down to release the jaws and allow the trap to be sprung. Thus it is seen that as the animal walks across the trap he first springs one platform and as he continues across the other platform is sprung, which causes the jaws to grasp the animal at or about the same place. This also prevents any liability of the animal not being caught, for, as before stated, it has to walk across the trap before the same is sprung.

Having thus described my invention, what I claim as new, and desire to secure by Letters Patent, is—

1. A trap comprising spring-operated jaws, independent platforms on opposite sides of said jaws, and means carried by said platforms for holding said jaws.

2. A trap comprising spring-operated jaws, independent platforms on opposite sides of said jaws and independent means carried by said platforms for holding said jaws.

3. A trap comprising spring-operated jaws, independent pivoted platforms on opposite sides of said jaws, and means carried by said platforms for holding said jaws.

4. In a trap, the combination with spring-operated jaws, of independently-pivoted platforms on opposite sides of said jaws, and inwardly-extending members carried by said platforms and adapted to hold said jaws.

5. In a trap, the combination with spring-operated jaws, of independently-pivoted platforms on opposite sides of said jaws and inwardly-extending members carried by said platforms and engaging said spring-jaws.

6. In a trap, the combination with spring-operated jaws, of independent platforms on opposite sides of said jaws, and inwardly-extending members carried by said platforms and adapted to hold said jaws in a downward position.

7. In a trap, the combination with upwardly spring-pressed jaws, of independent platforms on opposite sides of said jaws, inwardly-extending members carried by said platforms and adapted to extend over said jaws and hold them in a downward position against the tension of the spring.

8. In a trap, the combination with a base, of upwardly-extending members carried by said base, jaws pivoted between said members, a spring surrounding said members, stops carried by the upper ends of said members, to prevent the jaws from passing each other, independent platforms carried by said base and means carried by said platforms for holding the jaws in a downward position.

9. In a trap, the combination with a base, of upwardly-extending members carried by said base, jaws pivoted between said members, a V-shaped spring having its end surrounding said members, stops carried by the upper ends of said members to prevent the jaws from passing each other, independent platforms pivoted to said base, and means carried by said platforms for holding the jaws in a downward position.

10. In a trap, the combination with a base, of upwardly-extending members formed integral therewith, jaws pivoted between said members, a spring surrounding said members, inwardly-extending stops formed integral with said members at their upper ends, independent platforms carried by said base on opposite sides and means carried by said platforms for holding said jaws in a downward position.

11. In a trap, the combination with a base, spring-operated jaws pivoted to the same, upwardly-extending ears carried by said base, independent platforms pivoted to said ears on opposite sides of said jaws, and means carried by each platform for holding said jaws in a downward position.

12. In a trap, the combination with a base, spring-operated jaws pivoted to said base, upwardly-extending ears carried by said base, U-shaped members independently pivoted to said ears at their lower ends, platforms carried by said members on opposite sides of said jaws, and the upper portion of said U-shaped members adapted to pass over said jaws and hold them in a downward position against the tension of the spring.

13. In a trap, the combination with a base, upwardly-extending ears carried by said base, and having laterally-turned upper portions provided with diagonally opposite cut-away portions, spring-operated jaws mounted between said ears, independent platforms pivoted to said base, and independent means carried by each platform for holding the said jaws in a downward position independent of the other.

14. In a trap, the combination with a base, of upwardly-extending members formed integral therewith and having their upper ends cut away leaving diagonally opposite members which are turned down forming stops, jaws pivoted between said upwardly-extending members, a leaf-spring between said members, independent platforms pivoted to said base and means carried by said platforms for holding the jaws in a downward position.

15. In a trap, the combination with a base, of upwardly-extending members formed integral therewith, stops carried by the upper ends of said members, jaws pivoted between said members, a U-shaped spring surrounding said members and bearing against said jaws, upwardly-extending ears formed integral with the base on each side of the upwardly-extending members, platforms independently pivoted between said ears on each side of the jaws, and independent means carried by each platform for holding said jaws.

In testimony whereof I have hereunto set my hand in the presence of two subscribing witnesses.

MITCHEL LARAMIE.

Witnesses:
JOHN L. LEONARD,
AIME MARTINEAU.